(No Model.)

B. H. STEPHENS.
DEVICE FOR RAISING LOADED TRUCKS.

No. 489,339. Patented Jan. 3, 1893.

WITNESSES:
J. A. E. Criswell
C. Sedgwick

INVENTOR
B. H. Stephens
BY
Munn & Co
ATTORNEYS.

UNITED STATES PATENT OFFICE.

BENJAMIN HICKMAN STEPHENS, OF WOODLAND, CALIFORNIA.

DEVICE FOR RAISING LOADED TRUCKS.

SPECIFICATION forming part of Letters Patent No. 489,339, dated January 3, 1893.

Application filed July 18, 1892. Serial No. 440,353. (No model.)

*To all whom it may concern:*

Be it known that I, BENJAMIN HICKMAN STEPHENS, of Woodland, in the county of Yolo and State of California, have invented a new and Improved Device for Raising Loaded Trucks, of which the following is a full, clear, and exact description.

My invention relates to an improvement in facilities for elevating or raising trucks from the ground into a car upon an elevated platform, for example, and the object of the invention is to provide a frame especially adapted for attachment to two-wheeled trucks, or to that class of trucks employed by porters or stevedores for the transportation of merchandise.

Another object of the invention is to provide a frame so constructed that it may be expeditiously and conveniently coupled with a truck, and whereby the truck may also be quickly released therefrom.

It is another feature of the invention to provide means whereby when the frame is in connection with the truck both the truck and the frame may be elevated and carried readily and conveniently upon a high platform or into the body of a car or other vehicle.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 1:
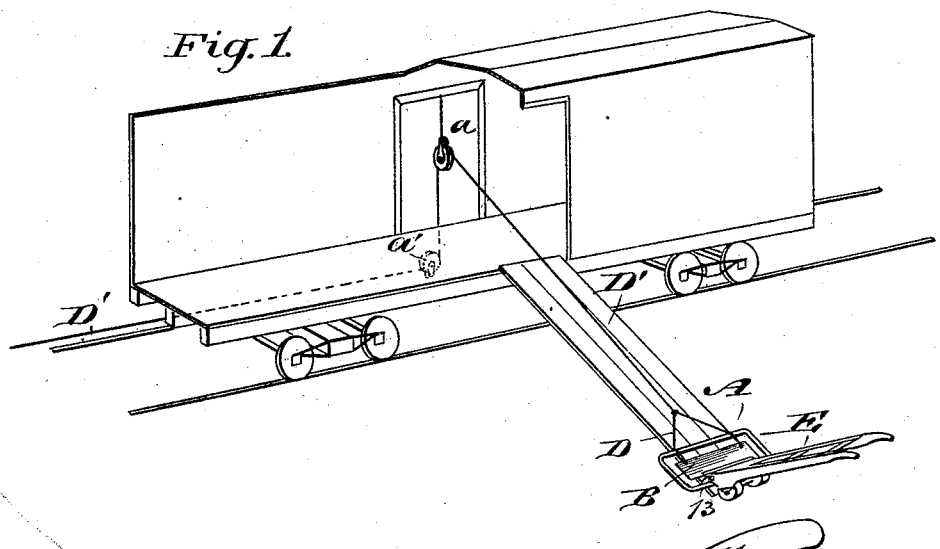
Figure 2:
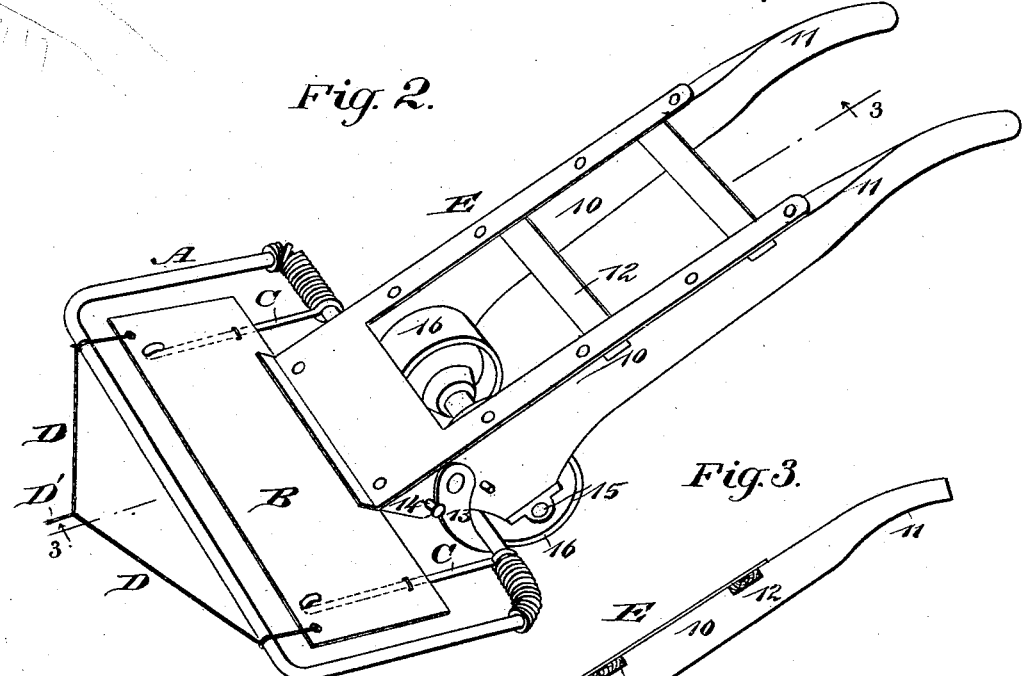
Figure 3:
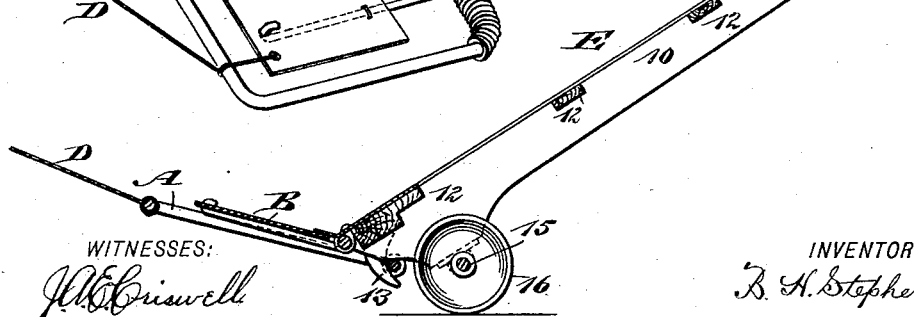

Figure 1 is a partial perspective view of a car, portions of it being broken away, illustrating the application to the car of the truck attachment, the attachment being also shown in connection with a truck, both in perspective; Fig. 2 is a perspective view of a truck and the attachment applied thereto; and Fig. 3 is a vertical longitudinal section through the truck and the attachment.

The attachment consists of the frame A, said frame being usually made of rectangular shape and of skeleton form, comprising side and end bars or end and top and bottom bars. The frame may be made of any approved material, metal being preferably employed, and within the frame a plate B, is located, the plate being of less length than the frame, so that a space is obtained between the lower edge of the plate and the lower portion of the frame. The space, however, between the upper edge of the plate and the upper member of the frame is ordinarily less in width than the lower space. The plate is held in position within the frame by means of arms C, which are secured to the plate near its ends and to the bottom member of the frame.

A rope or chain D, is attached at its ends preferably to the upper end portions of the plate B, and to the upper member of the frame A, the cord, rope or chain being so shaped as to form a loop, whereby one end of a hoist rope, cord or chain D' may be attached to it, the other end of the hoist rope being carried over suitable pulleys. One of the pulleys $a$, is located in the car door, or over the platform, or other suitable point within or upon a car; and the other pulley $a'$ is located outside of the car, approximately upon a level with the power to be applied to the hoist rope. The rope is passed over both pulleys.

The truck E, is of the ordinary construction employed in the transportation of merchandise for short distances, and embraces ordinarily a body comprising two side beams 10, terminating at one end in handles 11, and the side beams are connected by suitable cross bars 12. The ends of the side beams opposite the handle portions are reduced in thickness, and to these reduced portions of the sides hooks 13, are pivotally attached, the outward movement of the hooks being limited by stop pins 14. Near the outer end of the body an axle 15, is journaled upon the bottom portion thereof, and upon this axle the usual two wheels 16 are usually secured. The upper portion of the truck is shown as provided with the ordinary wear plate.

In the operation of the device a gang plank is employed, of suitable width to receive and support a truck. One end of the plank is placed upon the floor of the car, or upon the platform to which the truck is to be elevated, and its lower end is placed upon the ground or other convenient support. The frame having been attached to the hoist rope is left, for example, at the lower end of the plank, resting upon the floor, the ground, or lower support of the plank. After the truck has been loaded with grain, or with other mechandise, it is run by its driver up to the frame and is tilted slightly downward until the hooks 13 have gravitated outward a sufficient distance to pass over the lower or back bar or member of the frame, at which time the truck is slightly lowered, thereby effecting a locking connection between it and the frame. Power is then applied to the hoist rope and the frame and truck with its load is carried up the plank, the man attending the truck meanwhile retaining his grasp upon it and ascending with the truck. When the interior of the car is reached, or the point at which the material is to be delivered, without stopping, the party manipulating the truck lowers its forward end, then raises it, thus detaching the truck from the elevating frame. The truck may then be wheeled to any portion of the car, its contents dumped, and the truck is then rolled down the gang plank to receive another load and the frame is lowered for engagement with the next truck. The frame, however, may be lowered immediately after the first truck has been drawn upward.

The plate B, when it is employed, is adapted to support in a measure the load upon the truck.

This device is exceedingly simple, economic and durable, and by its means a loaded truck may be expeditiously and conveniently carried from the ground to any desired elevation, the truck meanwhile being under the supervision of its manipulator or driver.

Having thus described my invention I claim as new, and desire to secure by Letters Patent,—

1. The combination, with a truck provided with hooks pivoted at the side portions of its outer end, of a frame adapted for attachment to a hoist rope, the said frame being of skeleton shape, a plate located within the frame, a space being left between the lower edge of the plate and the lower portion of the frame, and arms connected with the frame and supporting the plate, as and for the purpose specified.

2. The combination, with a truck and hooks pivoted to the forward or outer ends of the truck at its sides, of a frame, a hoist rope connected with the frame, and a plate suspended within the frame, the hooks being adapted for automatic engagement with the frame, as and for the purpose set forth.

3. The combination, with an inclined plane, a hoist rope leading over the same, and a truck having hooks pivoted at the side portions of its frame and capable of swinging outward and inward, of a frame, an attachment between the frame and the hoist rope, the frame being adapted to travel upon the inclined plane, the said frame having a portion thereof fitted to receive and be grasped by the hooks of the truck, substantially as shown and described.

BENJAMIN HICKMAN STEPHENS.

Witnesses:
 HENRY S. JOSLYN,
 WILLIAM JOHNSTON.